US012293677B2

(12) United States Patent
Collen et al.

(10) Patent No.: US 12,293,677 B2
(45) Date of Patent: May 6, 2025

(54) AIRCRAFT COCKPIT TRAINING SIMULATOR AND ASSOCIATED METHOD

(71) Applicant: CAE USA INC., Tampa, FL (US)

(72) Inventors: Brian L. Collen, Arlington, TX (US);
Jimmie M. Davis, Jr., Arlington, TX (US);
Michael A. Gardner, Arlington, TX (US);
William L. Hunter, Jr., Arlington, TX (US);
Christopher A. Johnson, Arlington, TX (US)

(73) Assignee: CAE USA INC., Tampa, FL (US)

( * ) Notice: Subject to any disclaimer, the term of this patent is extended or adjusted under 35 U.S.C. 154(b) by 898 days.

(21) Appl. No.: 17/448,212

(22) Filed: Sep. 21, 2021

(65) Prior Publication Data

US 2023/0088372 A1    Mar. 23, 2023

(51) Int. Cl.
*G09B 9/16*    (2006.01)

(52) U.S. Cl.
CPC .................................... *G09B 9/16* (2013.01)

(58) Field of Classification Search
CPC . G09B 9/16; G09B 9/206; G09B 9/32; G09B 9/302; G09B 9/165; G09B 9/08; G09B 9/28; G09B 9/00; H04L 12/10; H04L 12/40045; B64F 5/60
See application file for complete search history.

(56) References Cited

U.S. PATENT DOCUMENTS

| | | |
|---|---|---|
| 5,933,656 A | 8/1999 | Hansen |
| 2004/0018481 A1 | 1/2004 | Smith et al. |
| 2009/0284934 A1 | 11/2009 | Nielsen et al. |
| 2020/0277847 A1* | 9/2020 | Rojas ............. G06Q 10/20 |
| 2021/0118256 A9 | 4/2021 | Falash et al. |

FOREIGN PATENT DOCUMENTS

| | | |
|---|---|---|
| EP | 3460781 | 3/2019 |
| RU | 2745162 | 3/2021 |

OTHER PUBLICATIONS

"Future Modular Common Reference I/O Interface Architecture," L3 Technologies, Inc., Link Training & Simulation; Arlington, TX; Contract No. FA8621-11-D-6261; SCARSC17-PROG-DD-003; Revised Sep. 20, 2018; 19 pages.
"Evolution of Ethernet in Control Systems," White Paper published on website of Galil Motion Control, Rocklin, California; https://www.galil.com/news/white-paper-evolution-ethernet-control-systems?force_isolation=true; Jan. 2014; 6 pages.

* cited by examiner

*Primary Examiner* — Dmitry Suhol
*Assistant Examiner* — Jose Angeles
(74) *Attorney, Agent, or Firm* — ALLEN, DYER, DOPPELT, + GILCHRIST, P.A.

(57) ABSTRACT

An aircraft cockpit training simulator includes a plurality of aircraft cockpit simulation panels and power over Ethernet (POE) cabling extending therebetween. Each panel includes a simulator user interface device, an input circuit or an output circuit, a POE interface circuit, and a distributed controller coupled to the input circuit or output circuit and POE interface device and asynchronously communicating with other controllers using a publish/subscribe protocol. A host controller is coupled to the distributed controllers via the POE cabling and operates the aircraft cockpit simulation panels using a host computer model. The distributed controllers may operate independent of the host computer model.

22 Claims, 3 Drawing Sheets

AIRCRAFT COCKPIT TRAINING SIMULATOR AND ASSOCIATED METHOD

FIELD OF THE INVENTION

The present invention relates to the field of training systems, and, more particularly, to an aircraft cockpit training simulator and related method.

BACKGROUND OF THE INVENTION

In many aircraft cockpit training simulators, the input/output (I/O) subsystem provides a functional Human Machine Interface (HMI), for example, an aircraft cockpit simulation panel having a display, instrument, or other machine interface. The panel bridges the software simulation with a student's physical capabilities such as touch or sight.

The accuracy of these simulators to real-life aircraft training varies greatly across training programs, from the use of real Avionics equipment to high fidelity simulated instruments and reconfigurable spatially, but inaccurate panels. A common goal with aircraft simulators is the requirement to interpret a student's physical input, or stimulate a student's senses.

Conventional aircraft cockpit training simulators are typically centralized and include a complex backbone of I/O equipment, power conversion and lighting control electronics. The centralized I/O simulator design requires densely populated distribution interfaces, custom wire harnesses, and in many cases, a large footprint of space. Additionally, the interface software for conventional training simulators is often proprietary and non-standardized. Small form factor versions of centralized simulators are gaining popularity, but those centralized simulators are not typically modular and do not support edge computing, e.g., processing data nearest the location that sources or uses the data at a panel. These centralized aircraft simulators also typically include proprietary or custom Application Programming Interfaces (APIs), which may not conform to a single standard.

Most conventional training simulators are host-driven, where the simulator's host processor runs a loop containing a large state machine that reads and writes individual bits to drive the various components in an aircraft cockpit simulator panels. That type of simulator has disadvantages. For example, the host computer may require specialized add-in interface cards, increasing complexity, and driver issues. Conventional simulators may also have a high interface wiring density, which increases material and assembly costs and requires a lengthy integration time. The cockpit panels are usually not testable until final assembly, when the interface equipment and connecting wires are in place. There is little modularity and standardization, and since the software code controlling the individual panels is tightly integrated with the host computer, it is vendor-specific and usually highly proprietary. This vendor specificity places constraints on update and replacement options, potentially driving up life-cycle costs significantly.

SUMMARY OF THE INVENTION

In general, an aircraft cockpit training simulator may include a plurality of aircraft cockpit simulation panels and power over Ethernet (POE) cabling extending therebetween. Each aircraft cockpit simulation panel may comprise at least one simulator user interface device, at least one of an input circuit and an output circuit coupled to the at least one simulator user interface device, a POE interface circuit, and a distributed controller coupled to the at least one of an input circuit and an output circuit and POE interface device configured to asynchronously communicate with other controllers using a publish/subscribe protocol. A host controller may be coupled to the plurality of distributed controllers via the POE cabling and configured to operate the plurality of aircraft cockpit simulation panels in accordance with a host computer model. The plurality of distributed controllers may also be capable of operating independent of the host computer model.

Each distributed controller may be configured to send a plurality of status messages asynchronously with respect to other distributed controllers. The at least one simulator user interface device may comprise at least one lighting device. The at least one simulator user interface device may comprise at least one power consuming device. The at least one simulator user interface device may comprise at least one of a switch, a lamp, a potentiometer, a joystick, and a display.

The at least one of an input circuit and an output circuit may comprise at least one analog input circuit, and in an example, may comprise at least one analog output circuit. The at least one of an input circuit and an output circuit may comprise at least one digital input circuit, and in yet another example, may comprise at least one digital output circuit.

Each panel may comprise at least one connector, and wherein the at least one of an input circuit and an output circuit, the POE interface circuit, and the distributed controller are in a form of a line replaceable unit (LRU) coupled to the at least one connector.

Another aspect is directed to a method of making an aircraft cockpit training simulator that may comprise coupling power over Ethernet (POE) cabling among a plurality of aircraft cockpit simulation panels, each aircraft cockpit simulation panel comprising at least one simulator user interface device, at least one of an input circuit and an output circuit coupled to the at least one simulator user interface device, a POE interface circuit, and a distributed controller coupled to the at least one of an input circuit and an output circuit and POE interface device configured to asynchronously communicate with other controllers using a publish/subscribe protocol. The method may also include coupling a host controller to the plurality of distributed controllers via the POE cabling and configured to operate the plurality of aircraft cockpit simulation panels in accordance with a host computer model, and wherein the plurality of distributed controllers are also capable of operating independent of the host computer model.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
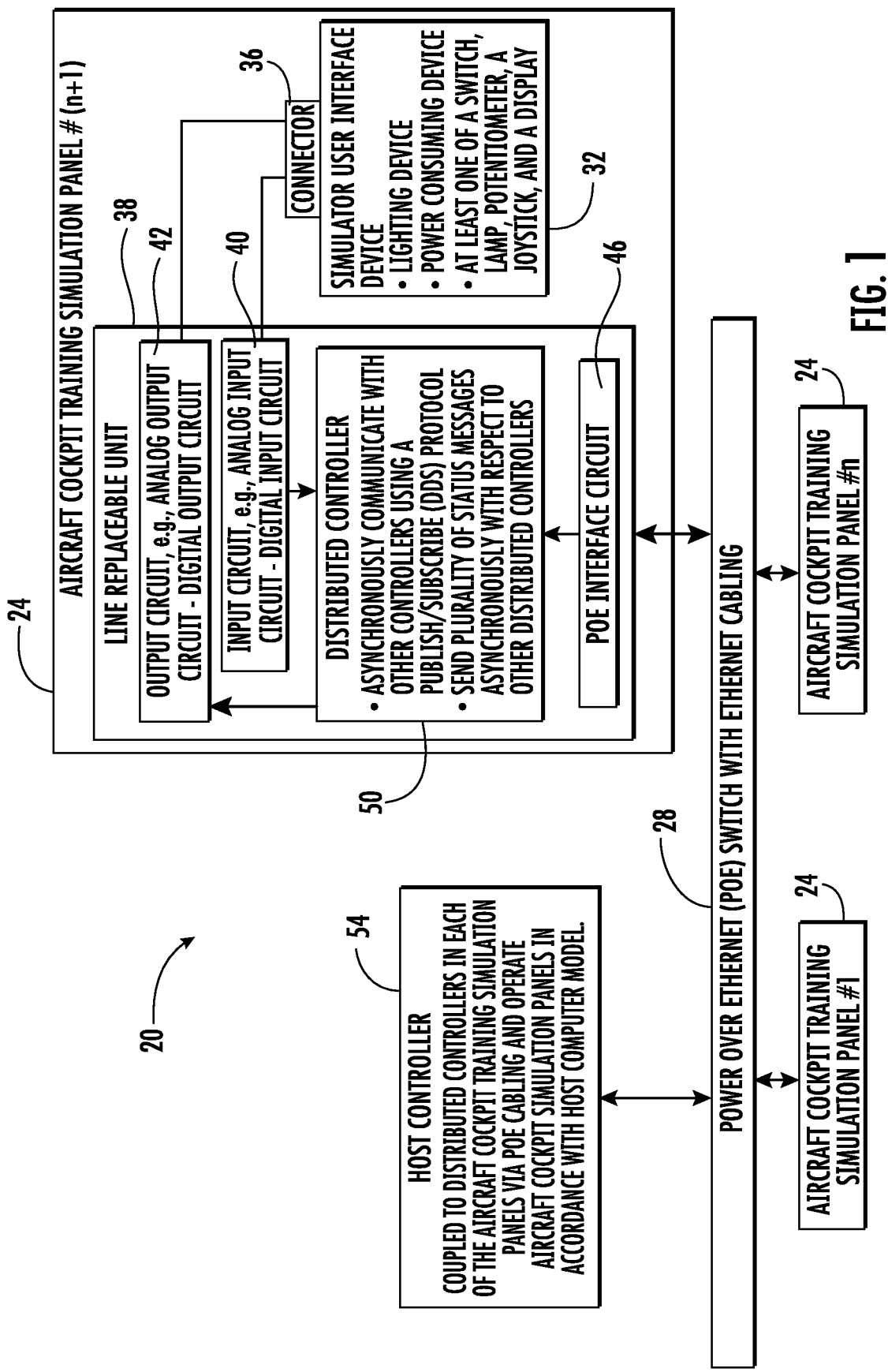
FIG. 1 is a block diagram of the aircraft cockpit training simulator according to the invention.

Referring initially to FIG. 1, an aircraft cockpit training simulator is illustrated generally at 20 and includes a plurality of aircraft cockpit simulation panels 24 illustrated as No. 1 and continuing to No. "n" and "n+1" to represent that there may be numerous aircraft cockpit simulation panels connected to power over Ethernet (POE) cabling 28 that may be a POE Ethernet switch with normal Ethernet cabling and extending between each of the aircraft cockpit training simulation panels. As represented by the aircraft cockpit training simulation panel No. (n+1) 24, each aircraft cockpit simulation panel includes at least one simulator user interface device 32 and at least one connector 36 coupled thereto. A line replaceable unit (LRU) 38 is at the aircraft cockpit simulation panel 24 and is coupled to the at least one connector 36 and includes at least one of an input circuit 40 and an output circuit 42 coupled to the at least one simulator user interface device 32.

The line replaceable unit 38 includes a POE interface circuit 46 that connects to the POE cabling 28. A distributed controller 50 is coupled to the at least one of an input circuit 40 and an output circuit 42 and the POE interface circuit 46 and configured to asynchronously communicate with other distributed controllers using a publish/subscribe protocol, such as a Data Distribution Service (DDS) protocol. A host controller 54 is coupled to the plurality of distributed controllers 50 via the POE cabling 28 and configured to operate the plurality of aircraft cockpit simulation panels 24 in accordance with a host computer model. However, each of the distributed controllers 50 is also capable of operating independent of the host computer model operated by the host controller 54. Each distributed controller 50 is configured to send a plurality of status messages asynchronously with respect to other distributed controllers. Status messages may be used to identify individual panels 24 and provide generic information about the panel to use for troubleshooting.

The simulator user interface device 32 may include at least one lighting device, at least one power consuming device, and at least one of a switch, a lamp, a potentiometer, a joystick, and a display. The output circuit 42 may include an analog output circuit and/or a digital output circuit, and the input circuit 40 may include an analog input circuit and/or a digital input circuit.

Each aircraft cockpit simulation panel 24 has its input and output functions controlled via the distributed controller 50. The LRU 38 may be formed as an input/output circuit card assembly operating in accordance with IEEE.802 standards with data transmissions at up to 1,000 megabits per second to other aircraft cockpit simulation panels 24 connected to the POE cabling 28. Each line replaceable unit 38, and thus, each aircraft cockpit simulation panel 24 to which the line replaceable unit is incorporated includes a dynamic network address. Each aircraft cockpit simulation panel 24 is therefore connected by a single Ethernet POE cable 28, which obtains power from POE and generates the voltage levels required for the different components at each aircraft cockpit simulation panel such as lighting, displays, and analog signal devices.

In the aircraft cockpit training simulator 20 as described, there is no signal distribution wiring, card rack, back plane, power supply racks, or lighting control equipment, and instead, each line replaceable unit 38 as part of a respective aircraft cockpit simulation panel 24 may be formed as a circuit card assembly directly connected to a specific distributed aircraft cockpit simulation panel. Different simulator user interface devices 32 may include switches, lamps, potentiometers, joysticks, displays, analog drives, and similar devices that are used in the aircraft cockpit training simulator 20. Each line replaceable unit 38 contains software that publishes and subscribes data in real-time over the POE cabling 28.

It is possible to connect many different aircraft cockpit simulation panels 24 via the cabling 28 and line replaceable units 38 and communicate at up to about 1,000 megabits per second to the host controller 54. Because each line replaceable unit 38 includes a unique Ethernet address, the host controller 54 may download specific configurations to each aircraft cockpit simulation panel 24 at power-up, allowing a single line replaceable unit to meet different functional simulator requirements and reduce the overall life cycle costs for the aircraft cockpit training simulator 20.

Each distributed controller 50 may include different components to function, and although not illustrated in detail, may include a central processing unit (CPU) connected via a parallel address/data bus to a system RAM, an analog-to-digital (A/D) converter, a digital-to-analog (D/A) converter, an analog multiplexer, EEPROM, and a POE negotiation and conversion sub-system. A crystal oscillator may be coupled to the CPU. Each distributed controller 50 may also include a plurality of Darlington Arrays that drive lamp outputs. Pull-up resistors may be provided for each of the inputs. A CPU and its on-board peripherals may act in coordination to input and output data on a state change or at the request of another aircraft cockpit simulation panel 24 or host controller 54. A digital input/output function as part of the digital output circuit 42 and digital input circuit 40 may have a function generated by the CPU, which provides extensibility and flexible boundary inputs and outputs. The distributed controllers 50 may publish respective inputs upon a change of state. The distributed controllers 50 may also subscribe to published data from other aircraft cockpit simulation panels 24.

Figure 2A:
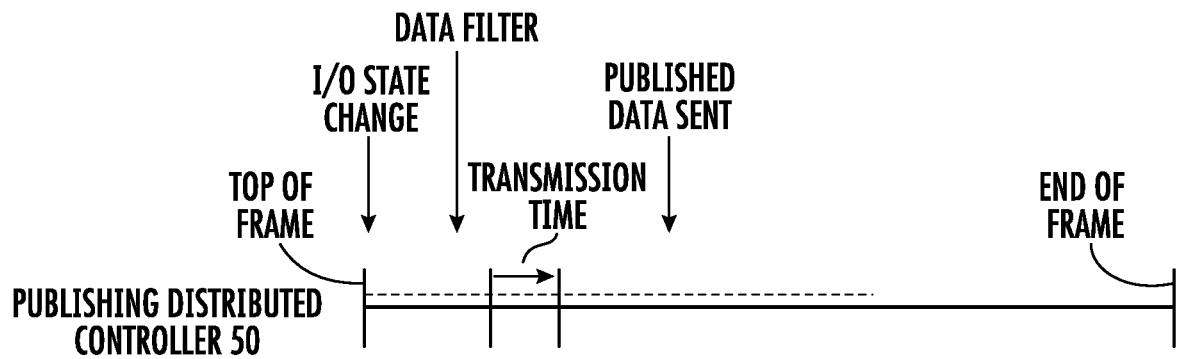
FIG. 2A is a timing diagram for data published by a distributed controller of an aircraft cockpit simulation panel incorporated in the aircraft cockpit training simulator shown in FIG. 1.
Figure 2B:
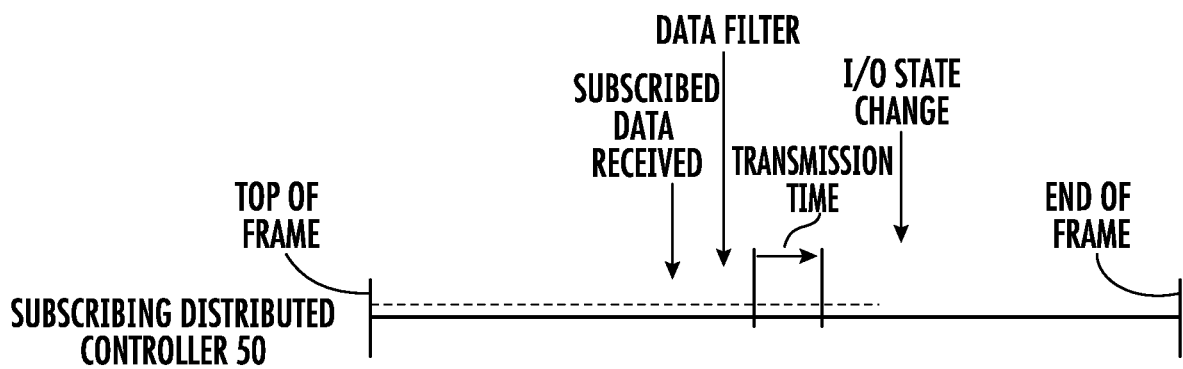
FIG. 2B is a timing diagram similar to that shown in FIG. 2A, but for data subscribing by a distributed controller.

Referring now to FIGS. 2A and 2B, timing diagrams illustrate the timing of data publication and data distribution for an aircraft cockpit training simulation panel 24. These timing diagrams in both FIGS. 2A and 2B may occur during the same frame on the same controller 50. At the top of a frame (FIG. 2A), the distributed controller 50 detects a state change by continuous sampling and filtering. The distributed controller 50 converts the data into a usable format and publishes the data for use by any subscribing distributed controller connected at other aircraft cockpit simulation panels 24 and to the host controller 54. The other aircraft cockpit simulation panels 24 that receive this data may also process the data as shown in the graph of FIG. 2B, and make a corresponding input/output state change. This technique of sampling significantly reduces latencies as data is published upon a change of state. The sampling technique may provide latencies of less than 4 milliseconds.

Input and output events may be published when the input and output changes state or when subscribing events change the input and output state. These events may occur asynchronously, which allows for the inputs and outputs to be handled in a non-blocking manner, and thus, reduce latency. When input and output events change state, the data is published, and when subscribed events are received, the input and output changes state. Thus, the transmission time or the time it takes to write or read the input and output data is dependent on the type of input and output data being written or read. This makes the latency in the writing and reading of inputs and outputs dependent only on the transmission time and the publishing and subscribing of event data through the published/subscribe protocol, such as DDS.

During normal system operations, the aircraft cockpit training simulator 20 may publish and subscribe data from various DDS "topics," which correspond to the state of a simulated aircraft and may include power and lighting bus information as non-limiting examples. The bus state may be controlled through specific switches in the panels 24 of the aircraft cockpit training simulator 20 and the host controller 54 may read the switches and registers and determine whether the bus should be on or off. Depending on an operating mode, the different aircraft cockpit simulation panels 24 publish this data out to all other aircraft cockpit simulation panels as to state changes, periodically, or when queried. This information may be parsed.

At the physical level, when an aircraft cockpit simulation panel 24 receives a new DDS command to exercise its outputs, a state check on the panel is executed and outputs may be changed according to a command value. For example, if the output is cockpit lighting, a pulse-width modulation (PWM) signal may have its duty cycle increased or decreased to brighten or dim the cockpit lighting. In the case of a power bus, a relay may be turned on or an indicator lamp may be lit as the output. To determine lighting intensity, a potentiometer may be used and a reference voltage may be applied to fixed-resistance terminals of a potentiometer, while a third terminal of the potentiometer, the wiper, may be used as an input to the aircraft cockpit simulation panel 24. The distributed controller 50 at the panel 24 may interpret this value through an A/D converter and the value may be published and the other aircraft cockpit simulation panels 24 connected via the POE cabling may have the updated state. This publish/subscribe approach may eliminate the requirement for the host controller 54 to be a broker.

In an example, two aircraft cockpit simulation panels 24 may be formed as an electrical control panel and an oxygen control panel and may interface to the host controller 54 via the POE cabling 28. This may occur with or without the host controller 54. An LRU 38 may communicate directly with another LRU. The electrical control panel may have a switch to control power, such as a 28 volt DC signal, and the oxygen control panel may have an indicator powered from the 28 volt DC. A signal from the host controller 54 may indicate how much oxygen is left. When the aircraft cockpit training simulator 20 is powered on, the host controller 54 may initiate a known-good state for the cockpit, including an oxygen level for the oxygen indicator. However, until the pilot flips the 28 volt DC bus switch to the "on" position, the oxygen indicator may not reflect any of the received oxygen level commands from the host controller 54 because it is performing the state check on the required bus. As soon as the pilot flips the 28 volt DC bus switch to the "on" position, the DDS message is sent and the oxygen indicator will reflect the oxygen level the host controller 54 has provided.

The host controller 54 may also induce failures into the cockpit training simulator 20. Because the DDS as the publish/subscribe protocol allows for multiple publishers and subscribers, the host controller 54 may simulate a failure by sending a DDS message that shows the 28 volt DC bus is "off," regardless of the switch position. By being able to mimic other aircraft cockpit simulation panels 24, the host controller has the ability to introduce a large number of virtualized failures for different training experiences.

As noted before, each aircraft cockpit simulation panel 24 includes a line replaceable unit (LRU) 38 that may operate independent of the host computer model run by the host controller 54. A real world example may be a radio that includes a black box LRU 38 where the radio enables a simulation model to reflect radio behavior experienced in an aircraft. This may include button responses, display pages, frequency updates, and related radio signal computation. Data required for integration into the larger aircraft cockpit training simulator 20, such as frequency and encryption, may be published using DDS. It is possible that the radio as part of an aircraft cockpit simulation panel 24 may be operated independent of other panels. This allows development and testing of the radio panel 24 without reference to the aircraft cockpit training simulator 20. This function may occur on a single aircraft cockpit simulation panel 24 or it may occur on any number of panels together, but still independent of the aircraft cockpit training simulator 20.

Each line replaceable unit 38, such as part of a lighting device, may generate 5 and 28 volts for use with different electromechanical and lighting devices. Lamp outputs may be driven by pulse width modulation (PWM) through low resistance Darlington Arrays configured as sinks. A continuous current of 1 amp and 3 amps peak may be provided with 100% loopback using variable voltage level sensing. The repair time of different aircraft cockpit simulation panels 24 may be reduced because of the use of the line replaceable units 38 that are at the panel level. A benefit is being able to remove an entire aircraft cockpit simulation panel 24 from the simulator 20 and swap it out without bringing the system down. This is not just limited to the LRU 38. In addition, faulty line replaceable units 38 may be evaluated and repaired outside the aircraft cockpit training simulator 20, which reduces downtime.

Each aircraft cockpit simulation panel 24 may have input and output functionality, and every light, switch, indicator, and other components may have a variable name, specific scaling, and hardware to software correlation. This data may be obtained from hardware design and interface data, which is usually manually hard coded or manually populated into files during code compilation. This process may be automated by standardizing hardware schematics and using a software application to write the required software definition directly from the hardware schematic into an aircraft cockpit simulation panel 24, and thus, reduce the time to generate software interface code.

It is possible to boot a panel 24 using the Trivial File Transfer Protocol (TFTP) and a DHCP service. Different DDS messages may include a status message that may be published by every aircraft cockpit simulation panel 24, such as at one second intervals, where each message will identify the aircraft cockpit simulation panel and provide generic information used for troubleshooting. A configuration message may be used to set specific panel 24 characteristics, such as how often to publish DDS data. Maintenance command messages may be available so that a panel 24 may subscribe to maintenance commands that perform common tasks, for example, on/off capabilities. A calibration message may be used because analog signals change over time and a message for calibrating analog devices and other components may be provided. A data message may contain input and output data and model data.

Different modes may be supported for DDS, including an event mode such as indicating a change in input and output data, or model data, and a polling or query mode where a subscriber may ask for data to initialize and synchronize itself with a publisher. A periodic or stream mode may be supported where data is continuously published at a set rate. Sample rates may be considered for different types of input and output data with simulator 20 specific requirements have rates that may be calculated using the speed of input signals, along with the simulator host frequency requirements such as 120 Hz. Different power over Ethernet categories may be employed such as Type 1 corresponding to Class 3 with 13 watts, and Type 2 as Class 4 with 25.5 watts. Type 3 as Class 6 may include 51 watts, and Type 4 as Class 8 may include 71 watts. Where the Power over Ethernet does not supply sufficient power for an aircraft cockpit simulation panel 24, an external DC voltage may be used.

Figure 3:
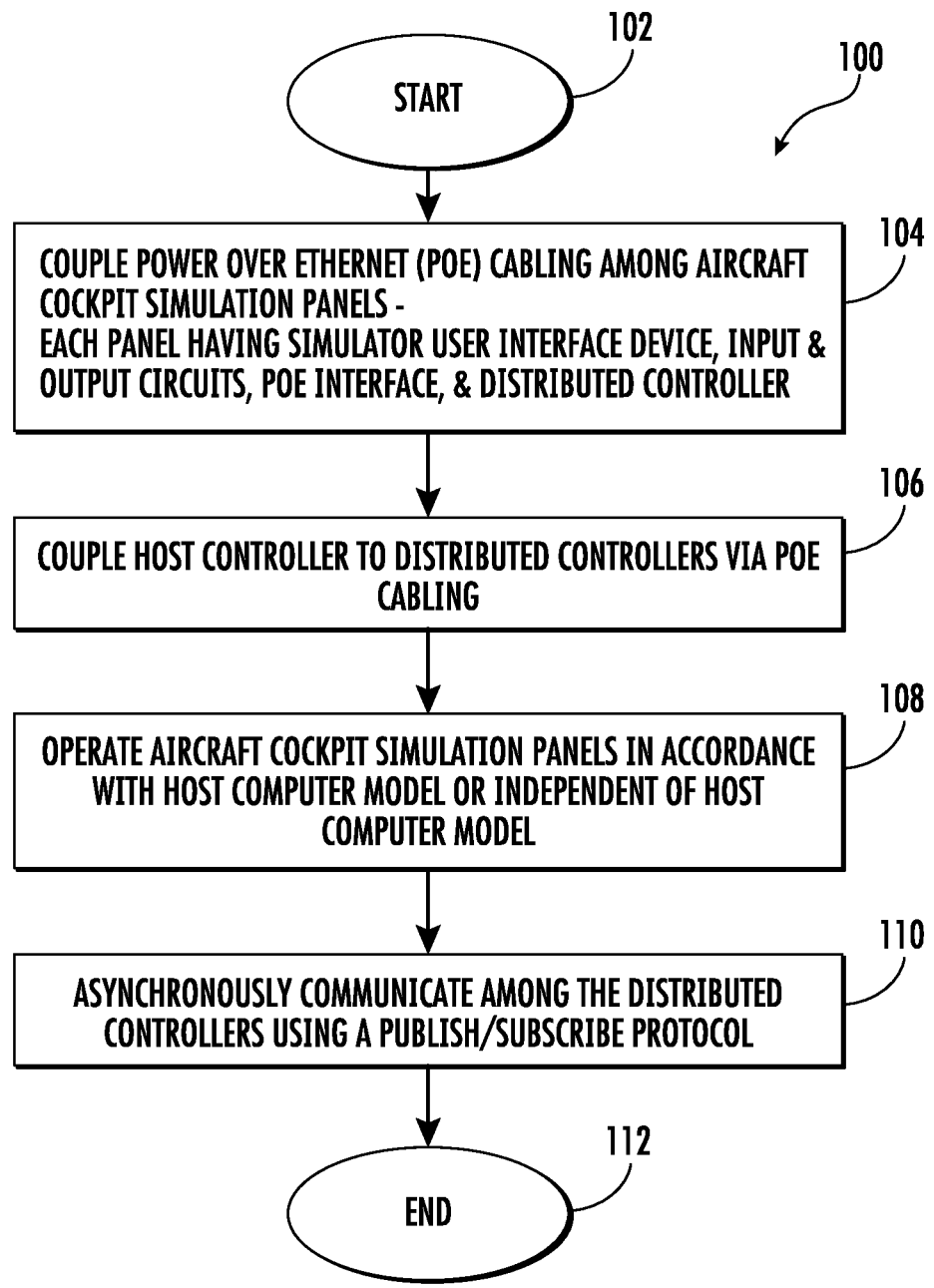
FIG. 3 is a high-level flowchart of a method for making the aircraft cockpit training simulator of FIG. 1.

Referring now to FIG. 3, there is illustrated a high-level flowchart of a method of making an aircraft cockpit training simulator 20 shown generally at 100. The process starts (Block 102) and power is coupled over POE cabling 28 among aircraft cockpit simulation panels 24 where each panel includes a simulator user interface device 32, input and output circuits 40, 42, POE interface circuit 46, and distributed controller 50 (Block 104). The host controller 54 is coupled to distributed controllers 50 via POE cabling 28 (Block 106) and the aircraft cockpit simulation panels 24 are operated in accordance with the host computer model or independent of host computer model (Block 108). The distributed controllers 50 asynchronously communicate using a publish/subscribe protocol (Block 110). The process ends (Block 112).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. An aircraft cockpit training simulator comprising:
a plurality of aircraft cockpit simulation panels and power over Ethernet (POE) cabling extending therebetween;
each aircraft cockpit simulation panel comprising
at least one simulator user interface device,
at least one of an input circuit and an output circuit coupled to the at least one simulator user interface device,
a POE interface circuit, and
a distributed controller coupled to the at least one of an input circuit and an output circuit and the POE interface circuit configured to asynchronously communicate with other distributed controllers using a publish/subscribe protocol; and
a host controller coupled to the plurality of distributed controllers via the POE cabling and configured to operate the plurality of aircraft cockpit simulation panels in accordance with a host computer model;
wherein each aircraft cockpit simulation panel comprises at least one connector; and
wherein the POE interface circuit, the distributed controller, and the at least one of an input circuit and output circuit are in a form of a line replaceable unit (LRU) coupled to the at least one connector, each aircraft cockpit simulation panel being capable of operating independently of all other cockpit simulation panels and the host computer model run by the host controller and being configured to facilitate development and testing of the respective aircraft cockpit simulation panel without reference to the other aircraft cockpit simulation panels and the host controller and host computer model.

2. The aircraft cockpit training simulator of claim 1, wherein each distributed controller is configured to send a plurality of status messages asynchronously with respect to other distributed controllers.

3. The aircraft cockpit training simulator of claim 1, wherein the at least one simulator user interface device comprises at least one lighting device.

4. The aircraft cockpit training simulator of claim 1, wherein the at least one simulator user interface device comprises at least one power consuming device.

5. The aircraft cockpit training simulator of claim 1, wherein the at least one simulator user interface device comprises at least one of a switch, a lamp, a potentiometer, a joystick, and a display.

6. The aircraft cockpit training simulator of claim 1, wherein the at least one of an input circuit and an output circuit comprises at least one analog input circuit.

7. The aircraft cockpit training simulator of claim 1, wherein the at least one of an input circuit and an output circuit comprises at least one analog output circuit.

8. The aircraft cockpit training simulator of claim 1, wherein the at least one of an input circuit and an output circuit comprises at least one digital input circuit.

9. The aircraft cockpit training simulator of claim 1, wherein the at least one of an input circuit and an output circuit comprises at least one digital output circuit.

10. An aircraft cockpit training simulator comprising:
a plurality of aircraft cockpit simulation panels and power over Ethernet (POE) cabling extending therebetween;
each aircraft cockpit simulation panel comprising
at least one simulator user interface device and at least one connector coupled thereto, and
a line replaceable unit (LRU) coupled to the at least one connector comprising
at least one of an input circuit and an output circuit coupled to the at least one simulator user interface device,
a POE interface circuit, and
a distributed controller coupled to the at least one of an input circuit and an output circuit and POE interface circuit configured to asynchronously communicate with other distributed controllers using a publish/subscribe Data Distribution Service (DDS) protocol; and
a host controller coupled to the plurality of distributed controllers via the POE cabling and configured to operate the plurality of aircraft cockpit simulation panels in accordance with a host computer model;
each aircraft cockpit simulation panel being capable of operating independently of all other aircraft cockpit simulation panels and the host computer model run by the host controller and being configured to facilitate development and testing of the respective aircraft cockpit simulation panel without reference to the other aircraft cockpit simulation panels and the host controller and host computer model.

11. The aircraft cockpit training simulator of claim 10, wherein each distributed controller is configured to send a plurality of status messages asynchronously with respect to other distributed controllers.

12. The aircraft cockpit training simulator of claim 10, wherein the at least one simulator user interface device comprises at least one lighting device.

13. The aircraft cockpit training simulator of claim 10, wherein the at least one simulator user interface device comprises at least one power consuming device.

14. The aircraft cockpit training simulator of claim 10, wherein the at least one simulator user interface device comprises at least one of a switch, a lamp, a potentiometer, a joystick, and a display.

15. The aircraft cockpit training simulator of claim 10, wherein the at least one of an input circuit and an output circuit comprises at least one analog input circuit.

16. The aircraft cockpit training simulator of claim 10, wherein the at least one of an input circuit and an output circuit comprises at least one analog output circuit.

17. The aircraft cockpit training simulator of claim 10, wherein the at least one of an input circuit and an output circuit comprises at least one digital input circuit.

18. The aircraft cockpit training simulator of claim 10, wherein the at least one of an input circuit and an output circuit comprises at least one digital output circuit.

19. A method of making an aircraft cockpit training simulator comprising:
    coupling power over Ethernet (POE) cabling among a plurality of aircraft cockpit simulation panels, each aircraft cockpit simulation panel comprising
        at least one simulator user interface device,
        at least one of an input circuit and an output circuit coupled to the at least one simulator user interface device,
        a POE interface circuit, and
        a distributed controller coupled to the at least one of an input circuit and an output circuit and the POE interface device configured to asynchronously communicate with other controllers using a publish/subscribe protocol; and
    coupling a host controller to the plurality of distributed controllers via the POE cabling and configured to operate the plurality of aircraft cockpit simulation panels in accordance with a host computer model;
    wherein each aircraft cockpit simulation panel comprises at least one connector; and
    wherein the POE interface circuit, the distributed controller, and the at least one of an input circuit and output circuit are in a form of a line replaceable unit (LRU) coupled to the at least one connector, each aircraft cockpit simulation panel being capable of operating independently of all other aircraft cockpit simulation panels and the host computer model run by the host controller and being configured to facilitate development and testing of the respective aircraft cockpit simulation panel without reference to the other aircraft cockpit simulation panels and the host controller and host computer model.

20. The method of claim 19, wherein each distributed controller is configured to send a plurality of status messages asynchronously with respect to other distributed controllers.

21. The method of claim 19, wherein the at least one simulator user interface device comprises at least one lighting device.

22. The method of claim 19, wherein the at least one simulator user interface device comprises at least one power consuming device.

* * * * *